United States Patent [19]

Kuno

[11] Patent Number: 5,346,643
[45] Date of Patent: Sep. 13, 1994

[54] POLYNUCLEAR COMPLEX SALT WASTE WATER CLARIFICANTS AND THEIR PREPARATION

[75] Inventor: Tadahiko Kuno, 14-16, Minamirinkan 8-Chome, Yamato-Shi, Kanagawa 242, Japan

[73] Assignees: Tadahiko Kuno, Kanagawa; Jun-ichi Hosokawa, Tokyo; Toko Abasu Co., Ltd., Kanagawa, all of Japan

[21] Appl. No.: 987,811

[22] Filed: Dec. 9, 1992

[30] Foreign Application Priority Data

Dec. 11, 1991 [JP] Japan .................................. 3-351057

[51] Int. Cl.$^5$ .............................................. C02F 5/02
[52] U.S. Cl. ........................ 252/175; 423/556; 423/558; 423/594; 210/716; 210/728; 502/414; 502/406
[58] Field of Search ............... 252/175, 178; 210/716, 210/728; 423/558, 556, 594, 600; 502/414, 406

[56] References Cited

U.S. PATENT DOCUMENTS

| | | | |
|---|---|---|---|
| 1,615,970 | 2/1927 | Wetherbee | 423/558 |
| 2,440,215 | 4/1948 | Allen et al. | 423/558 |
| 3,630,943 | 12/1971 | Myers et al. | 423/558 |
| 3,887,479 | 6/1975 | McLain | 423/594 |
| 3,994,819 | 11/1976 | Mollard et al. | 423/594 |
| 4,207,201 | 6/1980 | Hartmann et al. | 252/178 |
| 4,388,208 | 6/1983 | Gytel | 252/175 |
| 4,440,713 | 4/1984 | Rigby | 423/594 |
| 4,566,986 | 1/1986 | Waldmann | 252/175 |
| 4,707,349 | 11/1987 | Hjersted | 423/558 |
| 4,814,106 | 3/1989 | Kvant | 423/556 |

*Primary Examiner*—Prince Willis, Jr.
*Assistant Examiner*—J. Silbermann
*Attorney, Agent, or Firm*—Armstrong, Westerman, Hattori, McLeland & Naughton

[57] ABSTRACT

A wastewater clarificant very excellent in the powers for removing BOD, COD and SS is provided. The clarificant comprises an aqueous solution containing a polynuclear complex salt that is obtained by subjecting to isochoric heating an aqueous solution containing a mixture of sulfates of a plurality of metals selected from the group consisting of potassium, iron, calcium, sodium, magnesium and aluminum. Preferably, the clarificant comprises an aqueous solution containing a polynuclear complex salt that is obtained by subjecting to isochoric heating an aqueous solution containing a mixture of sulfates of a plurality of metals selected from the group consisting of, in molar concentration, 0.02 to 0.08 of potassium, 0.11 to 1.31 of iron, 0.003 to 0.030 of calcium, 0.004 to 0.040 of sodium, 0.27 to 0.81 of magnesium and 0.370 to 1.300 of aluminum.

5 Claims, No Drawings

POLYNUCLEAR COMPLEX SALT WASTE WATER CLARIFICANTS AND THEIR PREPARATION

BACKGROUND OF THE INVENTION

1. Field of the Invention

The present invention relates generally to a wastewater clarificant comprising an aqueous solution containing a polynuclear complex salt of sulfates of a plurality of metals, and more specifically to a wastewater clarificant that can easily reduce chemical oxygen demand (COD for short), biochemical oxygen demand (BOD) and suspended solids (SS) components in wastewater with an improved efficiency.

2. Description of the Prior Art

Conventional wastewater or clarification or disposal treatments have been chiefly achieved by adding flocculants to wastewaters for removal-by-sedimentation of contaminants. Well-used flocculants, for instance, are aluminum sulfate, aluminum chloride, polyaluminum chloride, ferric chloride, ferrous sulfate and polyferric sulfate.

For the treatments of wastewaters discharged from various plants such as those for processing foodstuffs, marine products and livestock products, dyeing materials and making paper, inorganic flocculants such as aluminum sulfate, aluminum chloride, polyaluminum chloride, ferric chloride and polyferric sulfate have been widely used.

For the treatments of wastewaters of high turbidity, the flocculants mentioned above may be used in combination with high-molecular flocculants such as anions and cations to improve the efficiency of flocculation. Biological disposal systems are often used, although this depends on what types of wastewaters are treated.

For treating wastewaters discharged from plants for farming marine products such as eel and fish, aeration systems are always used for making up for dissolved oxygen (DO for short).

A grave problem with these wastewater disposal techniques is that it is impossible to provide easy yet well-efficient reductions in COD, BOD and SS in wastewaters. A problem with using high-molecular flocculants such as anions and cations as clarificants is that they are harmful to the human body and water containing them, even if purified, cannot be recycled as drinkable water. Of wastewater clarificants, the above-mentioned chlorine compounds are now used in large amounts, but they form free chlorine that is a substance harmful to the human body.

Severe problems with using the wastewater clarificants based on chlorine compounds are that they form toxic chlorine compounds such as dioxin—that is detected from fishes and sludge in sea areas in which pulp effluents flow, causing environmental pollution or destruction. For instance, chlorination of indoor pools incurs an increase in atopic diseases and reddish hair, gives rise to the occurrence of trihalomethane in the presence of humic acid or causes other health hazards. On the other hand, governments and municipal corporations now place environmental integrity and hygiene under stricter control than ever before.

SUMMARY OF THE INVENTION

In order to overcome the problems mentioned above, the inventor has made intensive studies of developing inorganic flocculants in particular and consequently succeeded in developing a wastewater clarificant that is very excellent in the powers for removing BOD, COD and SS.

More specifically, the present invention provides a wastewater clarificant containing a polynuclear complex salt comprising sulfates of a plurality of metals selected from the group consisting of potassium, iron, calcium, sodium, magnesium and aluminum and a method of preparing it by subjecting an aqueous solution containing a mixture of sulfates of said metals by isochoric heating.

Preferably, the wastewater clarificant contains a polynuclear complex salt obtained by subjecting to isochoric heating an aqueous solution containing a mixture of sulfates of metals, in which 0.02 to 0.08 moles of potassium, 0.11 to 1.31 moles of iron, 0,003 to 0.030 moles of calcium, 0,004 to 0.040 moles of sodium, 0.27 to 0.81 moles of magnesium and 0.370 to 1.300 moles of aluminum are incorporated per 1,000 ml.

In other words, the wasterwater clarificant made up of a polynuclear complex salt comprising sulfates of metals according to the invention contains per 1,000 ml of water 0.78 to 5.63 g of potassium ions, 6.00 to 72.60 g of iron ions, 0.12 to 1.20 g of calcium ions, 0.10 to 1.00 g of sodium ions, 6.56 to 19.70 g of magnesium ions, 6.21 to 35.00 g of aluminum ions and 106.08 to 463.77 g of sulfuric ions.

Preferably, the wastewater clarificant of the invention is prepared by heating and pressurizing the above-mentioned aqueous solution containing a mixture of sulfates of metals (N.B., the upper limit of the iron content may be slightly increased to, for instance, 6.00 to 80.00 g) at 100° C. to 190° C. and 1 kgf/cm$^2$ to 10.0 kgf/cm$^2$.

DETAILED EXPLANATION OF THE INVENTION

Unexceptionally, the sulfate compounds are used for preparing the wastewater clarificant of the invention in order to ward off any possibility of environmental pollution and destruction which may otherwise be caused by the use of wastewater clarificants based on chloric compounds. To put it another way, the invention provides a wastewater clarificant that is made up of a polynuclear complex salt-containing aqueous solution obtained by subjecting to isochoric heating an aqueous solution containing a mixture of sulfates of metals selected from the group consisting of potassium, iron, calcium, sodium, magnesium and aluminum, and so is most unlikely to cause environmental pollution and destruction and is harmless to the human body as well.

For use, the wastewater clarificant of the invention is added to and stirred with wastewater to regulate its pH to about 4.0 to 5.0, and the pH of the wastewater is then again regulated to 6.0 to 8.5 by the addition of an alkali agent, whereby nearly all organic and inorganic matters, either visible or invisible, are flocculated, so that the wastewater can be clarified by their flocculation and sedimentation for removal.

The floc formed by the addition of the clarificant of the invention is well dehydrated, unlikely to be mechanically broken and not re-dissolved in the water, so that it can be easily treated by a sludge process, thus making a great contribution to cost reductions.

In addition, the clarificant of the invention belongs generally to the category "inorganic flocculant" mentioned above but, because of the features mentioned just below, it differs therefrom, making a great contribution to not only improvements in water clarification techniques but also other application fields such as environmental integrity and resource recycling.

Features of the Clarificant of the Invention (1) The wastewater clarificant of the invention reduces COD values considerably, as can be understood from the examples, given later.
(2) The wastewater clarificant of the invention has a strong flocculating power.

Aluminum sulfate, ferrous sulfate, ferric sulfate and magnesium sulfate are well-established flocculants, but the clarificant of the invention produces a flocculating power stronger and more composite than do these flocculants.

The clarificant of the invention is added to wastewater, which is then rapidly stirred in a pH range of 4 to 5 and is again regulated to pH 6.0 to 8.5 by the addition of, for instance, $Ca(OH)_2$, whereby SS removal is well achieved and both BOD and COD values are decreased considerably. The wastewater clarificant of the invention is more excellent than conventional biological disposal systems, because it can produce its own clarification effect on wastewater without difficulty, even when the wastewater contains salts, fats and the like.

(3) The clarificant of the invention is quite free from any component hazardous to the human body.

The metal sulfates in the composition or formulation of the invention are now used as treating agents for refined drinkable water production, food additives or aids for processing foodstuffs, and so are all harmless to the human body.

For instance, $Al_2(SO_4)_3$ that is a sulfate of aluminum is traditionally used as the flocculant for refined drinkable water production, while $FeSO_4$ that is a sulfate of iron is used with vegetables, fruit, salted vegetables, etc., as food additives such as enrichers and colorants. $MgSO_4$ that is a sulfate of magnesium is used for fermentable foodstuffs and as deacification agents, deodorants, hue stabilizers, bacterial removers, degree-of-fermentation regulators and heat insulating buffers for fermentation, while $K_2SO_4$ that is a sulfate of potassium is a nutrient supplier and enricher for foodstuffs. $CaSO_4$ that is a sulfate of calcium is used as a tofu coagulator and an acid neutralizer used for starch syrup production. $Na_2SO_4$ that is a sulfate of sodium is ordinarily used as a specific gravity regulator, dechlorination agent and defoamer for solvents for crystalline foodstuffs.

(4) The clarificant of the invention is excellent in the power for removing pathogenic bacteria (*Escherichia coli populations*) of aquatic infections, and so is efficacious against prevention of aquatic epidemics, as will be explained in terms of the data given later.
(5) The clarificant of the invention is of strong acidity (usually, pH 0.5 to 2.0), but is easy and safe to handle, because it is less irritative to the skin and is of no corrosive action albeit being a solution of metal sulfates.
(6) The clarificant of the invention has an action on removing unpleasant smells.

More specifically, the clarificant of the invention converts offensive smell-emitting substances such as ammonia, trimethylamine, methyl mercaptan and hydrogen sulfide into ammonia iron, amino-acid iron, methane and iron sulfide for deodorization.

As mentioned in connection with (4), the clarificant of the invention has an additional effect on removing unpleasant smell-emitting sources, because its antifungal properties serve to prevent corrosion of the wastewater to be treated.

DESCRIPTION OF THE PREFERRED EMBODIMENTS

The clarificant of the invention is excellent in clarifying wastewater, as mentioned above, and so is well applicable to clarifying industrial effluents such as those discharged from food and livestock processing plants and domestic wastewaters as well as to treating eutrophicated lakes, marshes and ponds.

The clarificant of the invention also makes some considerable contribution to wastewater recycling, making effective use of wastewater sludge and other various fields.

The present invention will now be explained, by way of example and not by way of limitation, with reference to some examples.

EXAMPLES

Example 1—Preparation of the first Clarificant

One wastewater clarificant of the invention was prepared as follows.

Dissolved in 300 ml of water were 5.3 g of $K_2SO_4$, 1.43 g of $CaSO_4$, 33.73 g of $FeSO_4.7H_2O$, 0.8 g of $NaSO_4.10H_2O$, 99.8 g of $MgSO_4.7H_2O$ and 205.0 g of $Al_2(SO_4)_3.18H_2O$.

Then, an additional amount of water was added to the solution to make 1,000 ml of an aqueous solution.

After that, 1,000 ml of the aqueous solution was heated and pressurized at 150° C. and 4.0 kgf/cm$^2$ to prepare a first wastewater clarificant of the invention.

The first clarificant was found to have a pH value of 0.94 and be mainly made up of a polynuclear complex salt.

Example 2—Preparation of the Second and Third Clarificants

Following the procedures of Example 1, the second and third wastewater clarificants of the invention were prepared. Each clarificant was chiefly made up of a polynuclear complex salt having a pH value and containing metal ions, as set out in Table 1.

TABLE 1

| Sample No. | Types and Amounts of Metal Ions | | | | | | | pH |
|---|---|---|---|---|---|---|---|---|
| | $K^+$ | $Fe^{2+}$ | $Fe^{3+}$ | $Na^+$ | $Mg^{2+}$ | $Ca^{2+}$ | $Al^{3+}$ | |
| 1st | 0.13 | 6.71 | 1.25 | 0.11 | 4.36 | 0.19 | 9.67 | 0.94 |
| 2nd | 1.46 | 17.40 | — | 1.28 | 12.10 | 0.13 | 15.90 | 1.31 |
| 3rd | 1.36 | 7.05 | 1.75 | 0.63 | 7.81 | 0.41 | 14.20 | 1.60 |

Experimental Example 1

The first, second and third clarificants of the invention were tested for COD in mg/l, BOD in mg/l, SS in mg/l and the number of E. coli populations in MPN/100 mml. For the purpose of comparison, polyferric sulfate (Comp. Ex. 1) and aluminum sulfate (Comp. Ex. 2) that are commercially available wastewater clarificants were likewise tested.

(1) COD Removal

Generally, one goal of wastewater treatments is to reduce COD.

Water samples were obtained from K Creek, UK Marsh and IB Marsh, and then tested for the capabilities of the first, second and third clarificants to remove COD.

One thousand (1,000) ml of each water sample, placed in a beaker, were tested with three clarificants, i.e., polyferric sulfate (Comp. Ex. 1), aluminum sulfate (Comp. Ex. 2) and the second clarificant of the invention.

One hundred (1000)ppm of each clarificant were added to each water sample under agitation, and Ca(OH)$_2$ was then added to the sample to regulate its pH to 7.0 to 7.5. The resulting floc was sedimented and separated to measure the COD value of the effluent.

As reported in Table 2, the results indicate that Comp. Exs. 1 and 2 are similar in terms of COD removal, but the effluent clarified by the second clarificant of the invention passes the standards for first-class city water and second-class water for fish farming; in other words, the effluent lends itself fit for establishing an environment suitable for aquatic life such as salmons and sweetfishes in oligotrophic lakes and carps and gibels in eutrophic lakes.

TABLE 2

| | COD Removal | | |
|---|---|---|---|
| | Comp. Ex. 1 | Comp. Ex. 2 | Invention |
| K Creek Influent, mg/l | 12.0 | 13.0 | 12.0 |
| Effluent, mg/l | 5.0 | 5.0 | 3.0 |
| Removal Rate, % | 58.3 | 61.5 | 75.0 |
| UK Marsh Influent, mg/l | 18.0 | 16.0 | 17.0 |
| Effluent, mg/l | 4.0 | 7.0 | 2.0 |
| Removal Rate, % | 77.8 | 56.2 | 88.2 |
| IB Marsh Influent, mg/l | 14.0 | 14.0 | 14.0 |
| Effluent, mg/l | 5.0 | 6.0 | 3.0 |
| Removal rate, % | 64.3 | 57.1 | 78.6 |

Note: Invention = 2nd Clarificant of the invention (2) BOD Removal

Another object of wastewater treatments is to reduce BOD.

In the instant experimentation, samples of wastewater discharged from a miso plant were tested for BOD removal.

Miso wastewater having an SS of 15,000 mg/1,000 ml was diluted to an SS of 1,780 mg/1,000 ml. Ten portions or samples of this diluted wastewater were placed in beakers, each of 1,000 ml in volume, and stirred with 400 ppm to 2,000 ppm of two clarificants, i.e., the clarificant according to Comparative Example 2 and the first clarificant of the invention. Then, suitable amounts of Ca(OH)$_2$ were added to the samples to regulate their pH values to 6.5 to 7.3 for measuring their BOD values.

As can be understood from the results set out in Table 3, the control samples showed BOD values larger than the environmental standards and those of E-class rivers, but the samples treated with the first clarificant of the invention passed the effluent standards for primary and secondary industrial waters and agricultural water, and so make a contribution to protecting rivers as well as lakes and marshes.

TABLE 3

| | Removal of BOD from Miso Wastewater | | | | | |
|---|---|---|---|---|---|---|
| Clarificant | Amount mg/l | Initial PH | REGULATED PH | BOD mg/l | SS mg/l | DO mg/l |
| 1ST CLARIFICANT | 2.0 | 5.14 | 7.01 | 5.7 | NOT DETECTED | 3.3 |
| | 1.5 | 5.73 | 7.14 | 6.0 | NOT DETECTED | 2.3 |
| | 1.2 | 5.81 | 6.83 | 6.0 | NOT DETECTED | 4.4 |
| | 0.8 | 6.35 | 7.10 | 6.3 | NOT DETECTED | 3.4 |
| | 0.6 | 6.55 | 7.13 | 6.3 | NOT DETECTED | 2.4 |
| 2ND CLARIFICANT | 1.0 | 4.29 | 6.68 | 11.0 | 2.0 | 5.1 |
| | 0.8 | 4.43 | 6.68 | 12.0 | 3.0 | 2.9 |
| | 0.6 | 5.07 | 7.29 | 12.0 | 6.0 | 6.3 |
| | 0.4 | 5.88 | 7.05 | 8.0 | 10.0 | 4.0 |
| CONTROL | | PH 7.29 | | 610 | 1,790 | 0.3 |

(1st Clarificant): pH 0.94 and Metal iron content of 22.42 g/l
(Comp. Ex. 1): pH 1.0 and Metal iron content of 80 g/l (3) SS Removal A further object of wastewater treatments is to separate SS, either organic or inorganic, from discharge waters. Basically, anions or cations are added to wastewater to flocculate and sediment SS colloidal particles.

The results of the SS removal test using the first clarificant of the invention and the clarificant according to Comparative Example 2 are set out in Table 3. Table 3 teaches that the first clarificant of the invention is much more excellent in SS removal power than aluminum sulfate (Comp. Ex. 2) that is currently used as the flocculant.

(4) Dissolved Oxygen (DO)

In terms of DO, both the first clarificant of the invention and the clarificant according to Comparative Example 2 came up to the standards for secondary industrial water and agricultural water as well as environmental integrity.

(5) E. coli Population Reduction

Assay of the number of E. coli populations in a park, pond

The pond water in DH Park in TB City was liver brown in color and covered on about 30% of the surface with the blue-green algae with water birds living therein. The first clarificant of the invention and aluminum sulfate (Comp. Ex. 2) were added to 1,000-ml water samples in amounts of 1 ml and 2 ml, respectively. Twelve hours later, the number of E. coli populations was counted by the maximum E. coli population number assay method (MPN method). The results are indicated in Table 4.

It is noted that both the samples treated with the first clarificant of the invention and aluminum sulfate come up to the standards for A-class rivers and A-class lakes and marshes (with the number of E. coli populations being 1,000/100 ml or less), but the sample treated with the first clarificant of the invention is much lower than that treated with aluminum sulfate in terms of the number of E. coli populations.

TABLE 4

| Clarificant | Assay of the number of E. coli populations | | |
|---|---|---|---|
| | Amount, mg/l | MPN/100 mg | Removal Rate, % |
| First Clarificant of the Invention | 1 | 170 | 92.3 |
| | 2 | 110 | 95.0 |
| Aluminum Sulfate | 1 | 490 | 77.7 |
| | 2 | 170 | 92.3 |
| Control | | 2,200 | |

Clarfication of bath water

The waters were sampled out of a domestic bath connected to a hot water supplier after three, six and nine volunteers had taken baths and on the day after nine took baths, and then treated with the third clarificant of the invention and liquid chlorine dioxide to assay their clarifying powers, i.e., pH, $KMnO_4$ consumption, the number of E. coli populations in MPN/100 ml and the number of other bacterial populations per 100 ml.

The nine volunteers were students, all athletic club members. The water samples were obtained from a central, 30-cm deep portion of the bathtub, after the water had been fully stirred.

Condition 1:

Each volunteer washed the body with hot water a few times before bathing, then soaked in the bathtub five minutes, then got out of the bathtub and washed the body, and finally soaked in the bathtub for five minutes. In the bathtub, each volunteer did not wash the body.

Condition 2:

Before testing, one (1) ml of the third clarificant of the invention or liquid chlorine dioxide was added to and mixed with 1,000 ml of each water sample to regulate its pH to about 7.3, and the resulting floc was filtered out.

The results are indicated in Table 5.

populations per 100 ml, that is 8.4 times as large as the water just after use.

By contrast, the waters treated with the third clarificant of the invention give favorable results or contain no E. coli population per 100 ml in all the cases mentioned above.

When the liquid chlorine dioxide is used, the number of E. coli populations remains at 0 until three have taken baths, but increases to 1,300 per 100 ml after six have taken baths or higher by 200 as compared with that in the absence of any clarificant and reaches 990 per 100 ml that is about half that in the absence of any clarificant. However, the water on the day after contained 24,000 per 100 ml that is considerably larger than 16,000 per 100 ml in the absence of any clarificant.

These results indicate that the clarificant of the invention is much more excellent in the clarifying power than chlorine dioxide that is widely used as a water clarificant in the U.S.A.

If the clarificant of the invention is added to the water after bathing at 1 ml per 1,000 ml everyday, that water can then be recycled as E. Coli—free water. In this connection, it is desired that the clarificant of the invention be used in combination with simple filter equipment.

(6) $KMnO_4$ Consumption

The standard for city water provides that $KMnO_4$ consumption is 10 mg/1. P on the day after, referred to in Table 5, is short of 10 and so is acceptable.

(7) Number of Other Bacterial Populations

The standard for city water, as mentioned above, provides that the number of bacterial colony populations formed in 1 ml of water is 100 or less. For instance, the water on the day after and C, each treated with the second clarificant of the invention, result in 440/100 m.=4.4<100 and 2,000/100 ml=20<100, respectively, or offer no problem. However, B is so excessive in terms of the number of populations that counting cannot be done, and so is said to be very foul water.

TABLE 5

| | | | Number of E. coli populations in bath water and related data | | |
|---|---|---|---|---|---|
| TEMPERA-TURE | | | $KMnO_4$ CONSUMPTION | NUMBER OF E. COLI POPULATIONS | OTHER BACTERIAL POPULATIONS |
| | (°C.) | PH | (mg/l) | (MPN/100 m$^3$) | (N/100 m$^3$) |
| WATER | 13 | 6.20 | 0 | 0 | 9 |
| HOT WATER | 43 | 6.00 | 3.49 | 0 | 3 |
| THREE B | 36 | 7.02 | 11.38 | 0 | 400 |
| P | 36 | 7.80 | 15.48 | 0 | 5 |
| C | 36 | 7.14 | 12.32 | 20 | 30 |
| SIX B | 33 | 7.02 | 15.48 | 1100 | 1000 |
| P | 33 | 7.75 | 17.06 | 0 | 40 |
| C | 33 | 6.94 | 15.80 | 1300 | 350 |
| NINE B | 34 | 7.04 | 14.53 | 1900 | 800 |
| P | 34 | 7.70 | 17.38 | 0 | 400 |
| C | 34 | 6.97 | 16.75 | 990 | 500 |
| NEXT B | 21 | 6.87 | 10.11 | 16000 | NOT COUNTED |
| DAY P | 21 | 5.61 | 9.48 | 0 | 440 |
| C | 21 | 6.99 | 11.06 | 24000 | 2000 |

Note 1: For use, liquid chlorine dioxide of 60,000 ppm and pH 2.43 was diluted to 1/60 (at pH 440).
Note 2: The second clarificant of the invention had a pH value of 1.6 and a metal ion content of 34.86 g/1,000 ml.
B: Clarificant-free bath water after use.
P: Bath water afer use, that was treated with the second clarificant of the invention.
C: Bath water after use, that was treated with liquid chlorine dioxide.

when no clarificant is used, the number of E. coli populations is 0 until three have taken baths, but increases after 6–9 have taken baths and reaches 1,900/100 ml after the ninth has bathed. The water on the day after nine have bathed contained 16,000 E. coli The standard for city water provides that E. coli should not be found therein. Thus, the addition of the third clarificant of the invention enables bath water to be recycled, and allows bath water to be maintained in well-enough condition, even when recycled, in terms of the number of bacterial colony populations.

As explained in the foregoing, the wastewater clarificant of the invention has the following beneficial effects and actions.

1. It can reduce COD and BOD values considerably
2. It has a strong flocculating power and is excellent in the power for removing SS as well.
3. It is much more excellent than conventional biological disposal systems, especially because it can effectively treat wastewater, even when it contains salts, fats, etc.
5. It is most unlikely to pollute or destroy natural environments, because of containing no component harmful to the human body.
5. It can be handled safely.
6. It is efficacious against prevention of aquatic epidemics, because of being excellent in the power for removing pathogenic bacteria (*E. coli* populations) inducing aquatic infections.
7. It has an action on removing various substances emitting unpleasant smells.

What is claimed is:

1. A wastewater clarificant containing a polynuclear complex salt comprising sulfates of potassium, iron, calcium, sodium, magnesium and aluminum, obtained by heating and pressurizing at 100° C. to 190° C. and 1 kgf/cm$^2$, an aqueous solution containing a mixture of said sulfates.

2. A wastewater clarificant comprising an aqueous solution containing a polynuclear complex salt that is obtained by subjecting to heating and pressurizing at 100° C. to 190° C. and 1 kgf/cm$^2$ to 10.0 kgf/cm$^2$ an aqueous solution containing a mixture of sulfates of potassium, iron, calcium, sodium, magnesium and aluminum.

3. A wastewater clarificant comprising an aqueous solution containing a polynuclear complex salt that is obtained by subjecting to heating and pressurizing at 100° C. to 190° C. and 1 kgf/cm$^2$ to 10.0 kgf/cm$^2$ an aqueous solution containing a mixture of sulfates of, in molar concentration, 0.02 to 0.08 of potassium, 0.11 to 1.31 of iron, 0.003 to 0.030 of calcium, 0.004 to 0.040 of sodium, 0.27 to 0.81 of magnesium and 0.370 to 1.300 of aluminum.

4. A wastewater clarificant comprising an aqueous solution containing a polynuclear complex salt comprising sulfates of a plurality of metals, which contains per 1 liter 0.78 to 5.63 g of potassium ions, 6.00 to 73.00 g of iron ions, 0.12 to 1.20 g of calcium ions, 0.10 to 1.00 g of sodium ions, 6.56 to 19.70 g of magnesium ions, 6.21 to 35.00 g of aluminum ions and 106.08 to 463.77 g of sulfuric ions.

5. A method for preparing a wastewater clarificant comprising an aqueous solution containing a polynuclear complex salt by subjecting to heating and pressurizing at 100° C. to 190° C. and 1 kgf/cm$^2$ to 10.0 kgf/cm$^2$ an aqueous solution containing sulfates of a plurality of metals, which contains per 1 liter 0.78 to 5.63 g of potassium ions, 6.00 to 80.00 g of iron ions, 0.12 to 1.20 g of calcium ions, 0.10 to 1.00 g of sodium ions, 6.56 to 19.70 g of magnesium ions, 6.21 to 35.00 g of aluminum ions and 106.08 to 463.77 g of sulfuric ions.

* * * * *